US008939271B2

(12) United States Patent
Petermann et al.

(10) Patent No.: US 8,939,271 B2
(45) Date of Patent: Jan. 27, 2015

(54) DEVICE FOR HANDLING VALUE DOCUMENTS

(75) Inventors: Udo Petermann, Altenbeken (DE); Paul Freitag, Steinheim (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 13/985,819

(22) PCT Filed: Feb. 15, 2012

(86) PCT No.: PCT/EP2012/052590
§ 371 (c)(1), (2), (4) Date: Sep. 9, 2013

(87) PCT Pub. No.: WO2012/110557
PCT Pub. Date: Aug. 23, 2012

(65) Prior Publication Data

US 2014/0027240 A1 Jan. 30, 2014

(30) Foreign Application Priority Data

Feb. 17, 2011 (DE) ......................... 10 2011 000 784

(51) Int. Cl.
*G07F 7/04* (2006.01)
*G06K 9/00* (2006.01)
*G07D 11/00* (2006.01)

(52) U.S. Cl.
CPC .............. *G07D 11/0084* (2013.01); *G07F 7/04* (2013.01)
USPC ........................................... 194/206; 382/135

(58) Field of Classification Search
CPC ........ G07F 7/04; B65H 2801/39; G06K 9/00; G06K 9/00442; G06K 9/00469; G06K 2007/00; G06K 2007/10; G01N 21/86; G07D 11/0084
USPC ................... 194/206, 207; 209/534; 235/379; 382/135, 137; 250/559.05, 559.07
See application file for complete search history.

(56) References Cited

U.S. PATENT DOCUMENTS 4,743,743 A 5/1988 Fukatsu
6,012,564 A * 1/2000 Mukai ........................... 194/206

(Continued)

FOREIGN PATENT DOCUMENTS

DE 19904536 A1 8/2000
EP 0845763 A1 6/1998

(Continued)

OTHER PUBLICATIONS

English Translation of the Written Opinion of the ISA for PCT/EP2012/052590, mailed May 8, 2012; ISA/EP, 5 pages.

(Continued)

*Primary Examiner* — Mark Beauchaine
(74) *Attorney, Agent, or Firm* — Harness, Dickey & Pierce, P.L.C.

(57) ABSTRACT

The invention relates to a device (10) for handling notes of value, comprising an input unit (20) for input of at least one note of value, and a transport unit (24, 26, 248, 302, 304) for transport of the note of value into a transport direction (P1) along a transport path (218). A control unit (28) determines the note of value type of the note of value dependent on an image comprising a representation of the input note of value that is captured by means of an image detection unit (306), and dependent on the note of value type determined controls at least one processing unit (400, 600) for further processing the note of value that is located downstream the image detection unit (306).

20 Claims, 3 Drawing Sheets

(56) References Cited

U.S. PATENT DOCUMENTS

| | | | | |
|---|---|---|---|---|
| 6,755,340 | B1 | 6/2004 | Voss et al. | |
| 6,757,419 | B1 | 6/2004 | Ross et al. | |
| 7,954,816 | B2 | 6/2011 | Freitag et al. | |
| 8,245,831 | B2 * | 8/2012 | Holl et al. | 194/206 |
| 8,340,391 | B2 | 12/2012 | Petermann | |
| 2005/0011722 | A1 * | 1/2005 | Nomura | 194/207 |
| 2010/0213023 | A1 | 8/2010 | Freitag et al. | |
| 2012/0211935 | A1 | 8/2012 | Petermann et al. | |
| 2013/0306433 | A1 * | 11/2013 | Obi et al. | 194/206 |

FOREIGN PATENT DOCUMENTS

| | | | |
|---|---|---|---|
| EP | 1324287 | A2 | 7/2003 |
| EP | 1331189 | B1 | 8/2006 |
| WO | WO-00-46764 | A1 | 8/2000 |

OTHER PUBLICATIONS

International Preliminary Report on Patentability for PCT/EP2012/052590 mailed Aug. 29, 2013 with English translation (14 pages).

* cited by examiner

DEVICE FOR HANDLING VALUE DOCUMENTS

CROSS-REFERENCE TO RELATED APPLICATIONS

This application is a National Stage of International Application No. PCT/EP2012/052590, filed Feb. 15, 2012, and published in German as WO 2012/110557 A1 on Aug. 23, 2012. This application claims the benefit and priority of German Application No. 10 2011 000 784.9, filed Feb. 17, 2011. The entire disclosures of the above applications are incorporated herein by reference.

BACKGROUND

This section provides background information related to the present disclosure which is not necessarily prior art.

1. Technical Field

The invention relates to a device for handling notes of value, which comprises an input unit for input of at least one note of value and a transport unit for transport of the note of value along a transport path in a transport direction.

2. Discussion

In particular, the device is a device for handling notes of value to which both banknotes and checks can be input that are processed and stored in different ways. A device of this type is, for example, known from document WO 00/46764. In the case of this known device the user must select via a select button whether deposit of checks or of banknotes is intended. Different sensors for detecting the inserted notes of value are activated according to this input, and the notes of value are handled differently, depending on their respective type. It is further known from this document, to distinguish between banknotes and checks with the help of a sensor and to set at least one control criterion as a function of the detected note of value type.

What is problematic with such a known device for input of banknotes and checks is that they offer only limited ease of use for the user, since the user is required to presort the note of value stack to be input into checks and banknotes and to select via the select button which type of notes of value he/she intends to put in. Thus, two steps are required for input of checks and banknotes.

From document EP 1 331 189 B1, a collecting compartment for notes of value is known.

SUMMARY OF THE INVENTION

It is an object of the invention to specify a device for handling notes of value which allows for input of notes of value of different types in an easy and user friendly manner.

By providing an image detection unit for taking at least one image comprising a representation of the at least one input note of value, it is possible to detect the type of the input note of value by means of a control unit in an easy manner. By controlling the processing unit for further processing of the note of value that is arranged downstream the image detection unit dependent on the detected note of value type, it is achieved that notes of value of different note of value types can be input together into the input unit, even if the notes of value are further processed in different ways by the processing unit dependent on their note of value type. Thus, different types of notes of values may be input as one mixed stack so that high ease of use is achieved for the person using the device since he/she may input all of the notes of value to be input in one single step.

The image detection unit comprises, in particular, at least one line of image detection elements aligned in a direction transverse to the transport direction of the notes of value and extending at least across the width of the note of value to be detected having the greatest width. Preferably, the imaging detection unit comprises a plurality of lines of image detection elements arranged one after the other in transport direction, each of them detecting an image of the note of value transported past the image detection unit. In addition, or as an alternative, the image detection unit may comprise also a camera.

In particular, a separating unit for separating the notes of value of a note of value stack input via the input unit is arranged downstream the input unit and upstream the image detection unit. The image detection unit in each case takes at least one image of each separated note of value, and the control unit detects the type of each note of value dependent on the respective at least one image, and controls the processing unit in accordance with the detected note of value type.

In a particularly preferred embodiment of the invention, the image detection unit takes a plurality of images of each note of value comprising a representation of said note of value. In particular, at least one image comprising a representation of the face and one image comprising a representation of the back of the note of value input are taken by means of the image detection unit. The more images are taken, the more reliably the classification of the notes of value of the individual note of value types may be effected, such that it is guaranteed that the notes of value are really classified into the correct note of value type, and thus further processing by means of the processing unit is effected correctly.

Preferably, an illumination unit is provided for illuminating the notes of value during image taking by means of the image detection unit. In particular, the illumination unit and the image detection unit are arranged in such a way that during image taking the note of value is located between the image detection unit and the illumination unit so that the note of value is transilluminated by the light emitted by the illumination unit. In this way, it is achieved that particular features of notes of value which are not or only hardly recognizable without backlighting are clearly represented in the image. By means of backlighting/transillumination in particular watermarks are detectable. In an alternative embodiment, the illumination unit may be arranged on the same side of the notes of value as the image detection unit so that reflective light is generated instead of backlight.

Based on the representation of the note of value comprised in the image the control unit preferably determines at least on dimension of the note of value and compares this determined dimension with preset dimensions of different types of notes of value. Based on the result of this comparison the control unit then determines the type of the note of value input. For this purpose, sets of data with the dimensions of different types of notes of value are stored in the control unit so that classification of the notes of value can be effected by simply comparing the determined dimension with these preset dimensions. In particular, several dimensions, preferably the width or the length, are preset for each type of notes of value, so that classification of the notes of value into the note of value types may be effected not only on the basis of one criterion but on the basis of a plurality of criteria such that classification is carried out even more reliably.

In addition, or as an alternative, characteristic features can be stored in the control unit for each of the different types of notes of value, wherein the control unit determines whether one of these features or a plurality of these features are present in the representation of the note of value. Based on the features determined from the representation and/or the features not determined from the representation, the control unit determines the type of the note of value.

Characteristic features to be used are in particular the presence of magnetic information, the presence of an optical encoding information, the presence of preset gray scale distributions, the presence of preset markings, the presence of preset image segments, the presence of preset water marks, and/or the presence of preset color gradients each in a respective preset area of the image of the note of value. The characteristic features used are in particular preset in a way that such characteristic features are used in consideration whereof as few features as possible allow for reliable classification into the different note of value types.

In a preferred embodiment of the invention, the control unit determines a gray scale gradient, a light-dark distribution, a color gradient, the infrared light reflection property and/or the infrared light absorption property in the image of the note of value. In accordance with the determined gradients or properties, respectively, the control unit in turn determines the type of the notes of value. In particular, the above mentioned characteristic features are determined in the above mentioned gradients and are compared with the preset features.

In a preferred embodiment of the invention, the control unit classifies, for notes of value of at least one type of notes of value, these notes of value into a plurality of sub-classes of notes of value in accordance with the respective image of the note of value. Alternatively, a plurality of sub-classes of notes of value into which the control unit classifies the notes of value may be preset for both types of notes of value. Classification of a type of notes of value into the corresponding preset sub-classes of notes of value is effected in particular dependent on the same characteristic features as described above. In particular, notes of value which were first classified as banknotes are classified into different currencies and/or different denominations dependent on these characteristic features. In a particularly preferred embodiment of the invention, the control unit controls the processing unit not only dependent on the type of note of value but in addition also dependent on the notes of value sub-class of the note of value to be processed.

The control unit classifies the notes of value as note of value types in particular into checks, banknotes and other sheet-shaped media. For this purpose, in a first step, the control unit preferably determines on the basis of the image of the note of value at least one dimension of the note of value in the representation and, dependent on this dimension, determines whether the note of value is a banknote or a check, by comparison with the preset dimensions. If it was determined in the first step that the note of value is a banknote or a check, the control unit in a second step verifies the presence of at least one preset characteristic feature of preset accepted banknotes. In a third step, the control unit verifies at least one further preset characteristic feature of checks, if it was determined in step two that the note of value is not an accepted banknote. Accepted banknotes are in particular those banknotes of a preset currency which are to be handled with the help of the device and are to be received in the device.

The processing unit comprises in particular a first intermediate storage for receiving checks and accepted banknotes and a second intermediate storage for receiving not accepted banknotes and other sheet-shaped media. Depending on the type of note of value which has been determined by means of the control unit, the note of value is transported to the first intermediate storage or to the second intermediate storage by means of a sorting gate. The notes of value intermediately stored in the second intermediate storage are returned to the user after all the notes of value input by the user as a stack via the input unit have been processed. Following input of a confirmation information by the user, the banknotes and checks intermediately stored in the first intermediate storage are further processed and are received in value note cassettes or stacking trays of the device.

Further, it is advantageous if the control unit detects damages of the note of value, in particular tears, holes, folds of parts of the note of value and/or missing parts of the note of value in the image of the note of value by means of a stored image processing algorithm and classifies the notes of value into damaged and undamaged notes of value in accordance with the detected damages. Those notes of value classified as damaged notes of value are received in the second intermediate storage, and are thus rejected, even if accepted banknotes or checks are concerned.

In a particularly preferred embodiment of the invention, the image detection unit captures a plurality of images comprising representations of the note of value input, and the control unit determines the type of the note of value input based on at least two of these images. In this case, the images may either all represent the same side of the note of value, or both sides of the note of value can be represented. Thus, even more accurate classification of the note of value into the note of value types is possible. In particular, in the case of double-sided image taking, even features which are present only on one side of the note of value can be taken into account for classification, regardless of the alignment in which the note of value was supplied by the user.

Further, it is advantageous if the illumination unit illuminates the note of value with light of different spectral ranges during capturing of at least two images. With different spectral ranges, different features of the note of value may be visible in the images so that the number of characteristic features available for classification of the note of value can be increased and even more accurate classification into note of value types is possible.

Further, the control unit can determine at least one feature of the note of value from the representation by means of a stored image processing algorithm, and generate data representative of information for controlling the processing unit and/or at least a further processing unit dependent on this feature. In particular, the control unit determines position and/or orientation of the note of value from the image and generates therefrom control data for controlling an aligning unit for aligning the notes of value arranged downstream of the image detection unit. The aligning unit preferably aligns the notes of value dependent on their note of value type in different preset target orientations, wherein different transport elements of the aligning unit are controlled for this purpose in accordance with the control data previously generated.

The processing unit preferably comprises a sorting gate for transport of the notes of value into a first transport path or at least one second transport path, and/or an aligning unit for aligning the notes of value. Notes of value to be rejected, i.e. in particular those notes of value classified as damaged notes of value and/or as other sheet-shaped media, are transported into the second transport path via the sorting gate, whereas the notes of value classified as accepted banknotes or as checks are transported via the sorting gate into the first transport path and further toward the aligning unit along said first transport path.

BRIEF DESCRIPTION OF THE DRAWINGS

The drawings described herein are for illustrative purposes only of selected embodiments and not all possible implementations, and are not intended to limit the scope of the present disclosure.

Further features and advantages of the invention result from the following description which in connection with the enclosed Figures explains the invention in more detail with reference to embodiments.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
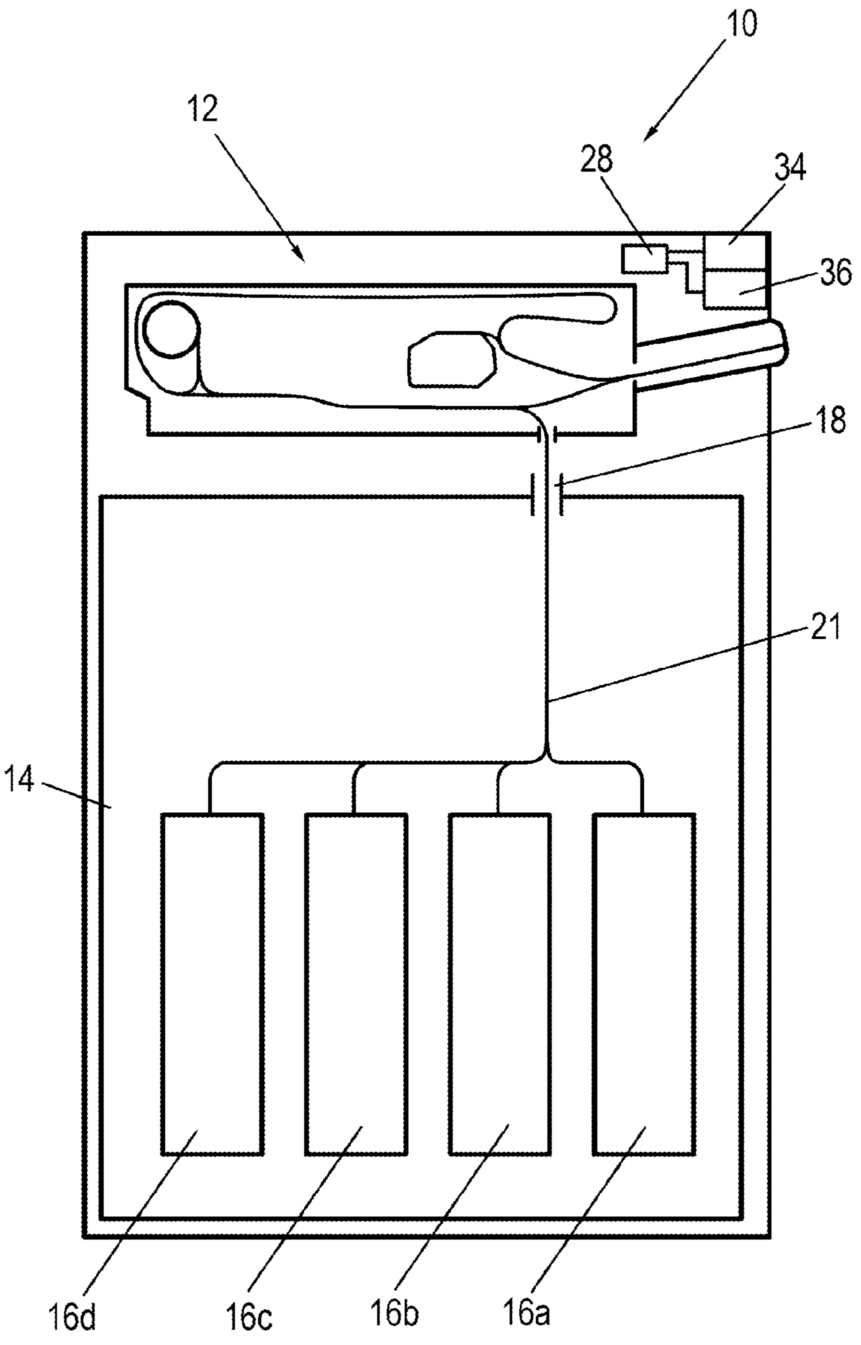
FIG. 1 shows a schematic illustration of a device for handling notes of value.

In FIG. 1, a schematic illustration of a device 10 for handling notes of value is illustrated. The device 10 is in particular an automatic cash safe, an automatic cash system and/or an automated teller machine, such as a deposit machine for depositing banknotes and checks.

The device 10 comprises a head module 12 and a safe 14. The structure of the head module 12 is described in more detail in connection with FIG. 2. In the safe 14, four value note cassettes 16*a* to 16*d* are arranged in which the notes of value can be held. Here, in particular one of the value note cassettes 16*a* to 16*d* is provided for holding checks and the other three value note cassettes 16*a* to 16*d* are provided for holding banknotes. The banknotes are in particular held in a type-specific manner, i.e. in one value note cassette 16*a* to 16*d* always only banknotes of one specific denomination are contained. Alternatively, also a mixed storage may be realized, i.e. that in one value note cassette 16*a* to 16*d* notes of value of different denominations are held in a mixed manner. In an alternative embodiment, also more than four or less than four, in particular two value note cassettes 16*a* to 16*d* can be provided in the safe 14. In particular, a so-called reject cassette can be provided in which notes of value are held that are suspected of being counterfeit and/or are damaged. In a preferred embodiment, two value note cassettes 16*a* to 16*d*, namely one for holding checks and one for holding banknotes are provided.

Here, the notes of value can be held in the value note cassettes 16*a* to 16*d* in stacked form in a receiving area as well as wound up between two film tapes onto a roller store. Different types of value note cassettes can also be used within the safe 14.

In the present embodiment, the device 10 can be designed as a mere depositing device into which notes of value can only be deposited. Alternatively, it can also be designed as a recycling device into which notes of value can be deposited and can again be withdrawn therefrom.

The safe 14 has a transfer slot 18 through which the notes of value are supplied from the head module 12 to the safe 14. From the transfer slot 18, the notes of value are transported via a transport unit identified with the reference sign 21 to the value note cassettes 16*a* to 16*d*.

Figure 2:
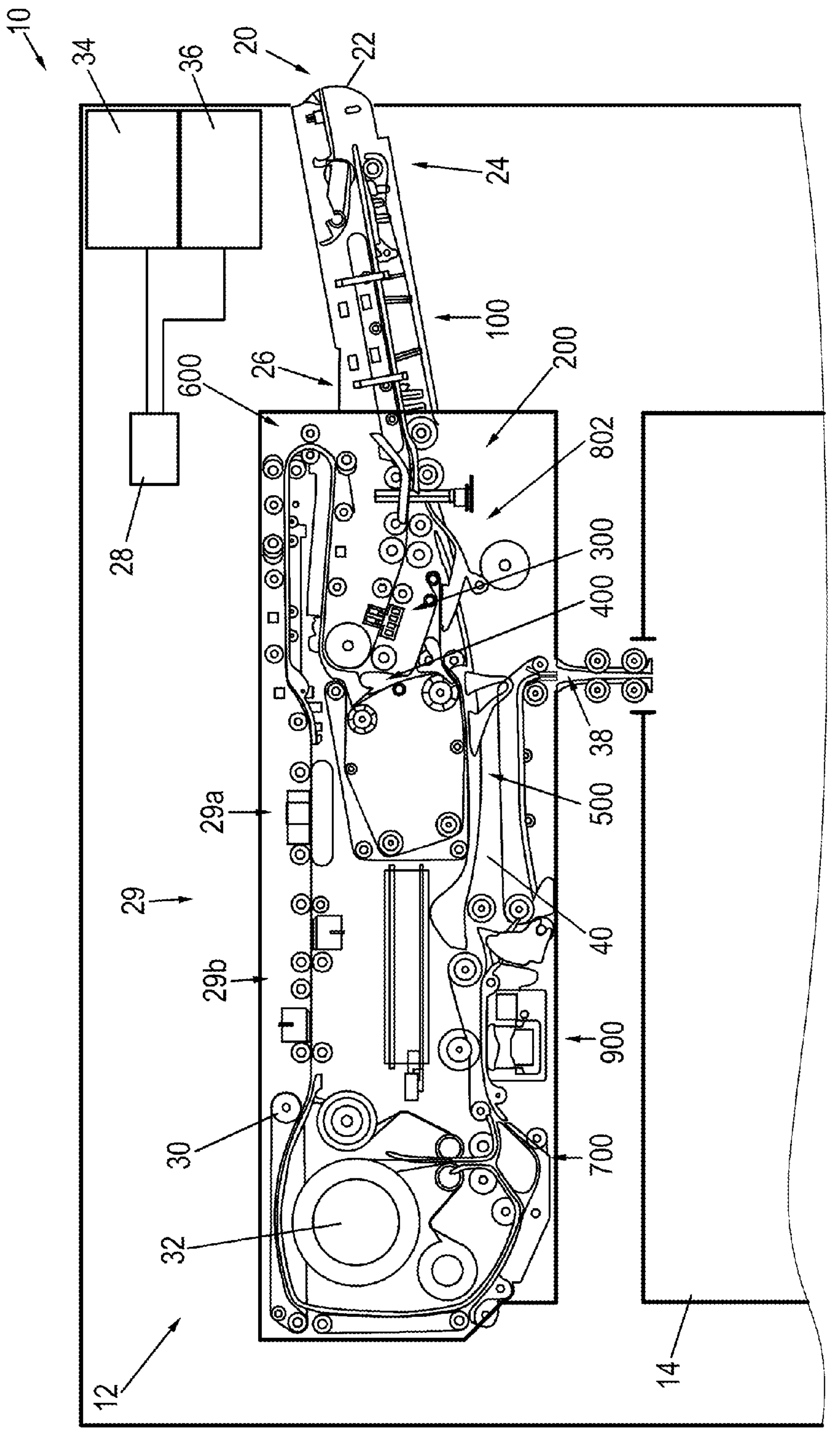
FIG. 2 shows a schematic illustration of a head module of the device according to FIG. 1.

In FIG. 2, a schematic illustration of the head module 12 according to FIG. 1 is shown. The head module 12 has an input and output unit 20 via which the notes of value can be input in the form of a value note stack. Further, via this input and output unit 20 individual notes of value and/or value note stacks can again be output to the user of the device 10. The input and output unit 20 in particular has a so-called shutter 22 by means of which an opening for feeding and outputting the notes of value can be opened and closed.

A value note stack input via the input and output unit 20 is transported to a first aligning unit 100 by means of a transport unit 24. By means of the first aligning unit 100, the notes of value of the value note stack are placed into a preset orientation or at least the orientation of a part of the notes of value of the value note stack is changed such that it is approximated to the preset orientation. By means of a transport unit 26, the aligned value note stack is supplied to a separating unit 200 which separates the notes of value of the value note stack and supplies the separated notes of value to a first sensor unit 300.

The first sensor unit 300 comprises an image detection unit by means of which at least one image with a representation of this note of value is taken of each supplied note of value. Dependent on the representation of the note of value in the image, a control unit 28 of the device 10 determines at least one feature of the note of value and, dependent on this feature, classifies the note of value into checks, banknotes of a preset currency and other sheet-shaped media. The other sheet-shaped media can, for example, be notes of value of a currency different from the preset one and/or other sheet-shaped media which were erroneously input by the user of the device. For example, these can be business cards or account statements. The preset currency is in particular the currency that is to be handled by means of the device 10, in particular that is to be held in the value note cassettes 16*a* to 16*d*.

Those notes of value that were neither classified as checks nor as banknotes of the preset currency will be transported via a sorting gate 400 into a second intermediate storage 500 for intermediate storage of sheet-shaped media and will be intermediately stored therein preferably as a second value note stack. The checks and the banknotes of the preset currency, on the other hand, are supplied via the sorting gate 400 to a second aligning unit 600. By means of this second aligning unit 600 the checks are aligned in a first preset target orientation and the banknotes are aligned in a second target orientation differing from the first target orientation. In particular, several different target orientations for banknotes of different denominations are preset and the second aligning unit 600 aligns the notes of value in different preset target orientations not only dependent on whether checks or banknotes are concerned but additionally also dependent on the denomination of the banknotes.

The aligned notes of value are then supplied to a second sensor unit 29 by means of which the authenticity of the banknotes is determined and by means of which magnetic information on the checks is read out. The sensor unit 29 comprises a banknote sensor unit 29*a* by means of which the authenticity of the banknotes is verified and a check sensor unit 29*b* by means of which the authenticity of the checks is verified and information printed on the checks is read out. The first sensor unit 300 and the second sensor unit 29 form together with the control unit 28 in particular a non-counterfeit money and check detection module. In the determination of the authenticity of the banknotes and/or checks preferably also information determined by means of the sensor unit 300 is taken into account. In particular, the sensors which are used in known non-counterfeit money and check detection modules for verifying authenticity of the banknotes and/or checks are distributed to the sensor units 29, 300 which are spaced apart from each other within the transport path. Thus, the sensor unit 300 allows for document pre-detection which is required for sorting notes of value to be returned and/or for controlling the aligning unit 600, without the necessity of providing additional sensors for this purpose. Consequently, a simple, compact and cost-efficient structure is achieved.

Subsequently, the notes of value are transported toward a second sorting gate 700 by means of further transport elements, one of which is exemplarily identified with the reference sign 30. Via the second sorting gate 700, all notes of value of the previously input value note stack which were classified as checks or banknotes of the preset currency, are at first supplied to a first intermediate storage 32 and intermediately stored therein. The intermediate storage 32 is in particular designed in the form of a roller store in which the notes of value to be held are held in a wound up manner between two film tapes. After all notes of value of the input value note stack have been accommodated in the first intermediate storage 32 or the second intermediate storage 500, at least one information about the notes of value held in the first intermediate storage 32 and/or in the second intermediate storage 500 is output to the user via a display unit 34. This information in particular comprises information about the number of input notes of value and/or the value of the sum of the denominations of the input notes of value that are held in the first intermediate storage 32. Further, the user is in particular asked to input a confirmation information via an input unit 36.

When no confirmation information is input via the input unit 36 by the user within a preset time interval after request and/or when the user makes a negative input then the notes of value contained in the first intermediate storage 32 are transported away from this store and are supplied to a stacking unit 40, by means of which a first value note stack is formed from all notes of value contained in the first intermediate storage 32. Further, the second value note stack contained in the second intermediate storage 500 is removed from the second intermediate storage 500. Both the first value note stack and the second value note stack are supplied to a stack combining unit 802 by means of which a single combined value note stack is formed from the first and the second value note stacks. This combined value note stack is then returned to the user via the input and output unit 20.

When, on the other hand, the user inputs the confirmation information within the preset time interval after the respective request, then the second value note stack is removed from the second intermediate storage 500 and is returned to a user via the input and output unit 20.

The notes of value intermediately stored in the first intermediate storage 32, on the other hand, are supplied along a transport path 38 to the safe 14 and are received in the value note cassettes 16*a* to 16*d*. Before they are transported into the safe 14, the checks intermediately stored in the first intermediate storage 32 are cancelled in that a cancellation print image is printed onto a preset print area of the check. For this purpose, a printing unit 900 for imprinting the checks is provided between the second sorting gate 700 and the transport path 38. Via the sorting gate 700, the checks are supplied to the printing unit 900 such that the printing area on which the cancellation information is to be printed faces the print head of the printing unit 900 so that the print head can print the cancellation print image onto this printing area.

By means of the afore-described head module 12, it is achieved that in one device 10 checks and banknotes can be handled together and these can be supplied to the device in an arbitrarily mixed manner in one stack. In this way, a particularly high operating comfort is achieved for a user of the device 10 as the user does not have to manually presort the notes of value into checks and banknotes nor does he have to preset which type of notes of value is supplied, as is the case in known devices.

Figure 3:
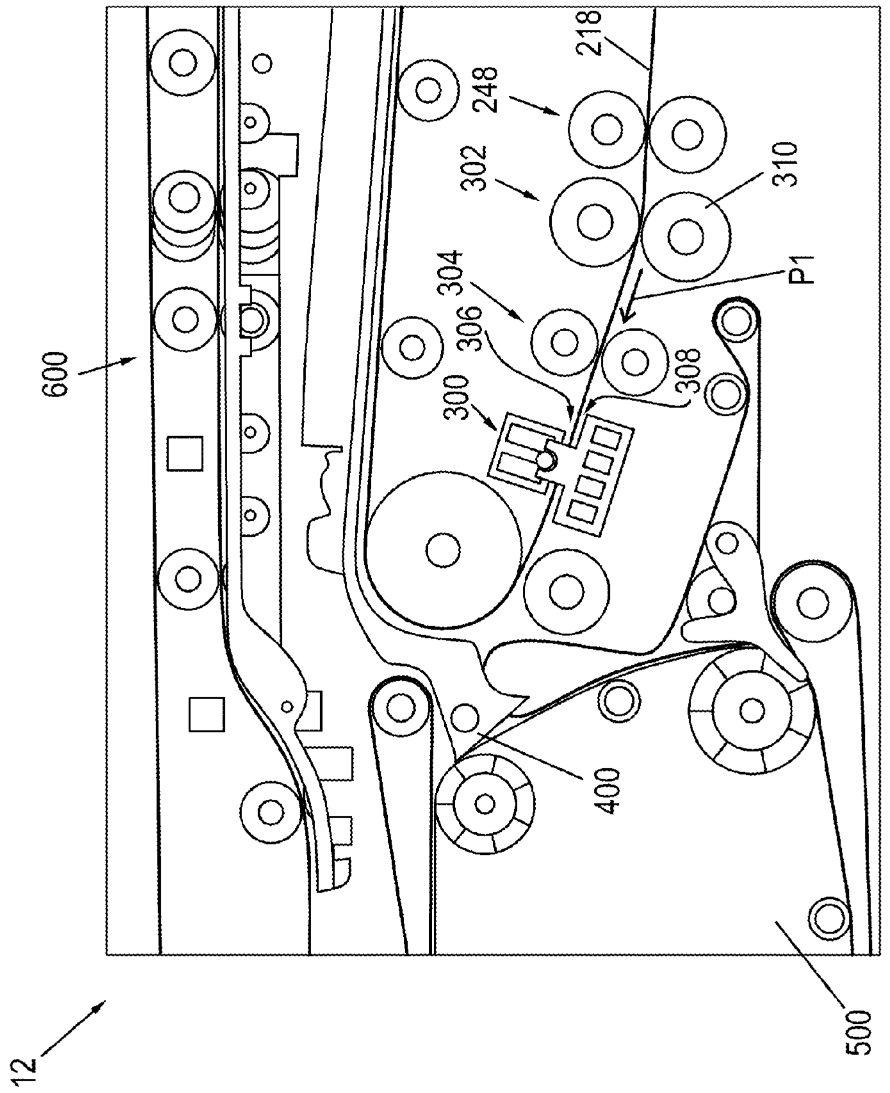
FIG. 3 shows a schematic illustration of a detail of the head module according to FIG. 2.

In FIG. 3, a schematic view of a detail of the head module 12 according to FIG. 2 is illustrated, wherein in particular the sensor unit 300 is shown. After the notes of value of the value note stack mentioned have been separated by means of the separating unit, the separated notes of value are transported separately along a transport path 218 by means of transport elements 248, 302, 304 and are supplied to the sensor unit 300 arranged downstream of the separation unit 200. The transport elements 248, 302, 304 are in particular designed as a plurality of roller pairs, each pair comprising two rollers which are arranged at opposite sides of the transport path 218, one of them being exemplarily designated by reference sign 310. Between the rollers of a roller pair, a gap is formed through which the note of value is transported. At least one roller of each roller pair, preferably both rollers of each roller pair, are drivable by means of a driving unit, in particular a central driving unit of the device 10, such that the driven roller transports the note of value located in the gap via the contact with said note of value in transport direction P1, thus supplying it to the sensor unit 300.

The sensor unit 300 comprises an image detection unit 306 arranged on a first side of the transport path 218, and an illumination unit 308 arranged on a second side of the transport path 218 opposite to the first side. A note of value located between the illumination unit 308 and the image detection unit 306 is backlit, and thus also light is transmitted through it. At least one image comprising a representation of the note of value is captured by means of the image detection unit 306. In a preferred embodiment of the invention, a plurality of image, in particular an image sequence is taken from each note of value supplied to the sensor unit 300.

In an alternative embodiment of the invention, a plurality of image detection units can be provided wherein the image detection units are preferably arranged such that images comprising representations of both sides of the note of value can be captured by means of them. In another alternative embodiment of the invention, the illumination unit 308 may be arranged on the same side as the image detection unit 306, such that the note of value is illuminated via reflection light.

For better readability, the method by means of which the control unit 28 classifies the notes of value dependent on the image captured by means of the image detection unit 306 or dependent on the images captured by the image detection unit 306, respectively, into different notes of value is explained in the following for capturing one image of the note of value to be classified. The explanations are, by analogy, applicable to capturing a plurality images, wherein a more accurate classification is possible when a plurality of images is taken.

The image detection unit 306 captures the image of the note of value during transport of the note of value past it in transport direction P1. Thus, there is no need for stopping the banknote such that fast processing of the notes of value is possible. In an alternative embodiment of the invention, the note of value may be stopped temporarily when it is located between the image detection unit 306 and the illumination unit 308. When the note of value is stopped, the image is captured by means of the image detection unit 306 before the note of value is further transported in transport direction P1.

The control unit 28 determines in a first step at least one dimension of the note from the representation of the note of value comprised in the image. For this purpose, an image processing algorithm is stored in the control unit 28 that is executed by the control unit 28 for determining said dimension. The control unit 28 preferably determines not only one dimension of the note of value but both, length and width of the note of value. Here, length is in particular to be understood as the lengths of the longer edges of the note of value whereas width is the length of the shorter edges of the note of value. The note of value is transported in particular in a short-side-first manner, i.e. with one of the shorter edges first.

Further, the dimensions of checks and banknotes to be processed by means of the device 10 are preset in the control unit 28. By comparing the determined dimensions of the note of value with said preset dimensions, the control unit 28 determines in the first step whether the note of value could be a banknote or a check based on the dimensions.

If it is determined in the first step that the note of value cannot be a banknote or a check, this note of value is classified as other sheet-shaped media. In this case, the control unit 28 controls the sorting gate 400 such that the latter directs the note of value into the second intermediate storage 500 in which notes of values are temporarily stored which are returned to the user via the input and output unit 20 after all the notes of value of the stack input via the input and output unit 20 have been processed. Therefore, notes of value temporarily stored in the second intermediate storage 500 are referred to as rejected banknotes.

Additionally, the control unit 28 is capable of detecting damages of the banknote, such as tears, folds, holes, and the like, in the image by means of a further preset image processing algorithm, and of classifying the notes of value into damaged and undamaged notes of value depending thereon. The damaged notes of value are likewise supplied to the second intermediate storage 500 via the sorting gate 400, and are thus rejected, regardless of whether banknotes, checks or other sheet-shaped media are concerned.

If, however, it was determined in the first step that the note of value could be a banknote or a check based on its dimension, presence of at least one preset characteristic feature of banknotes is verified in a second step. For this purpose, so-called currency data sets are stored in the control unit 28 that contain various characteristic features of different banknotes to be processed by means of the device 10, in particular of different currencies and different denominations of banknotes of the different currencies. The control unit 28 verifies whether said preset features are detectable in the image, and dependent on this comparison it determines whether the banknote is an accepted banknote. Accepted banknotes are those banknotes which belong to the set of currency to be processed by the device 10. In particular, specific security features of the banknotes may be used as characteristic features. Further, for example the presence of marks, logos and/or water marks can be detected.

Should the control unit 28 determine that the note of value is an accepted banknote, the banknote is supplied to the aligning unit 600 via the sorting gate 400. The banknote is aligned in a target orientation preset for this type of banknotes by means of the aligning unit 600.

In case it is determined in the second step that, on the other hand, the note of value is not an accepted banknote it is verified in a third step whether the note of value is a check. For this purpose, characteristic features of checks to be processed are stored in the control unit 28, too, and the control unit 28 verifies whether the preset feature or the preset features, respectively, are present in the image by comparing the image with said preset features. Should the comparison verify that the note of value is a check, the control unit 28 controls the sorting gate 400 such that the latter supplies the check to the aligning unit 600. The aligning unit 600 aligns the check in a target orientation preset for checks. In particular, the target orientation preset for checks differs from the target orientation preset for banknotes so that the control unit 28 uses the information obtained from the image not only for controlling the sorting gate 400 and sorting of the notes of value, but also for controlling the aligning unit 600.

Further, the control unit 28 may determine other features, such as the orientation and/or position of the note of value depending on the representation of the note of value comprised in the image and may additionally consider these determined features when controlling the control unit 28.

A characteristic feature of checks verified is in particular the presence of magnetic information in a preset area of the supposed check. Typical checks have a so-called MICR code line comprising a single-line magnetic imprint with a preset character height of 2.8 mm through 3.2 mm located in an area the rest of which is free of magnetism, the so-called clear band. Detection of this magnetic information on the note of value to be monitored is effected in particular via illuminating the note of value with light within the infrared spectral range and evaluating the reflection and/or absorption properties of the note of value in the area in which the MICR code line should be present. The reflection and/or absorption property of the magnetic imprint clearly differs from that of the clear band such that the presence of the magnetic imprint can be determined reliably in an easy manner.

Additionally or alternatively, a light-dark distribution in the image may be determined and compared with a preset light-dark distribution of checks. In this manner, it is in particular possible to detect an optic code line of checks.

Furthermore, specific gray distributions, preset marks, preset logos, or preset water marks may be stored as characteristic features. By means of preset image processing algorithms, the control unit 28 checks whether at least one or a plurality of said preset characteristic features is present in the image. Dependent on the result of this comparison, the control unit 28 determines whether the note of value is a check.

In particular, a plurality of images of the note of value may be captured for determining the presence of the characteristic preset features, wherein different spectral ranges are captured when capturing different features and the image of the note of value is evaluated in said different spectral ranges. Thus, in particular such characteristic features on notes of value may be considered, too, which are visible only in a certain spectral range.

The above-described order of the three steps is interchangeable. In particular, after having determined that the note of value could be a check or a banknote on the basis of the dimensions, it could be first determined whether the notes of value are checks via the check-specific characteristic features. If it was determined that it is not a check, it is determined via comparison with the banknote-specific characteristic features whether an accepted banknote is concerned.

In a particularly preferred embodiment of the invention, steps 1 through 3 may be carried out simultaneously so that an especially quick classification of the notes of the value into the individual note of value types is effected. Thus, fast processing of the notes of value is achievable.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A device for handling notes of value, comprising:

an input unit for input of at least one note of value;

a transport unit for transport of the note of value in a transport direction along a transport path;

an image detection unit for capturing at least one image comprising a representation of at least one note of value input; and a control unit configured to determine a note of value type of the input note of value dependent on the image, and control, dependent on the determined note of value type, at least one processing unit for processing the note of value arranged downstream of the image detection unit;

wherein:

the control unit is configured to classify the note of value type of each one of the notes of value as a check, a banknote, or an other sheet-shaped media;

the control unit is configured to determine, in a first step, at least one dimension of the note of value based on the representation of the note of value in the image, and determine whether the note of value could be a banknote or a check dependent on said dimension;

if the control unit determines in the first step that the note of value could be a banknote or a check, in a second step the control unit is configured to verify the presence of at least one characteristic feature of preset accepted banknotes; and if it was determined in the second step that the note of value is not an accepted banknote, in a third step the control unit is configured to verify the presence of at least one preset characteristic feature of checks.

2. The device according to claim 1, wherein a separation unit for separating the notes of value of a note of value stack input via the input unit is arranged downstream of the input area and upstream of the image detection unit, that the image detection unit captures at least one image of each separated note of value, and that the control unit respectively determines the note of value type dependent on said image, and controls the processing unit accordingly.

3. The device according to claim 1, wherein the control unit determines at least one dimension of the note of value based on the representation of the note of value in the image, compares the determined dimension with preset dimensions of the different note of value types, and determines the note of value type dependent on this comparison.

4. The device according to claim 1, wherein the control unit determines a gray scale gradient, a light-dark distribution, a color gradient, the reflection property of infrared light, and/or the absorption property of infrared light in the image of the note of value, and that the control unit determines the note of value type dependent thereon.

5. The device according to claim 1, wherein for notes of values of at least one note of value type, the control unit classifies said notes of value into a plurality of sub-types of notes of value dependent on the respective representation of the note of value.

6. The device according to claim 1, wherein the control unit by means of a stored image processing algorithm detects damages of the note of value, in particular tears, holes, folds of note of value parts, and/or missing note of value parts in the representation of the note of value, and that the control unit classifies the notes of value into damaged notes of value and undamaged notes of value dependent on the detected damages.

7. The device according to claim 1, wherein the control unit, determines at least one feature of the note of value from the representation by means of a stored image processing algorithm, and that the control unit generates data containing information for controlling the processing unit and/or at least one further processing unit dependent on said feature.

8. The device according to claim 1, wherein the processing unit comprises a sorting gate for transport of the notes of value into a first transport path or at least a second transport path, and/or an aligning station for aligning the notes of value.

9. The device according to claim 1, wherein an illumination unit is provided for illuminating the note of value during capturing the image by means of the image detection unit.

10. The device according to claim 9, wherein the note of value is arranged between the image detection unit and the illumination unit when the image is captured.

11. The device according to claim 1, wherein characteristic features for the different note of value types are stored in the control unit, that the control unit determines whether one of these features or a plurality of these features is present in the representation of the note of value, and that the control unit determines the note of value type dependent on the features determined in the representation and/or not determined in the representation.

12. The device according to claim 11, wherein the control unit uses the presence of magnetic information, of optic coding information, of preset gray scale distributions, of preset marks, of preset image segments, of preset water marks, and/or of preset color gradients, in a respective preset area of the representation of the note of value as characteristic features.

13. The device according to claim 1, wherein the image detection unit captures a plurality of images comprising representations of the input note of value, and that the control unit determines the note of value type of the input note of value dependent on the images.

14. The device according to claim 13, wherein an illumination device illuminates the note of value with light of different spectral ranges when capturing at least two images.

15. A device for handling notes of value comprising:

an input device configured to receive the notes of value;

a transport unit configured to transport the notes of value in a transport direction along a transport path of the device;

an image detection unit configured to capture at least one image of each one of the notes of value;

at least one processing unit arranged downstream of the image detection unit in the transport path, and configured to process the notes of value;

a control unit configured to:

determine in a first step at least one dimension of each one of the notes of value based on the at least one image to determine whether each one of the notes of value is a banknote, a check, or other sheet-shaped media based on the at least one dimension, and control the at least one processing unit based on the determination;

verify in a second step presence of at least one predetermined characteristic feature of preset accepted banknotes present in a first note of the notes of value if the control unit previously determined that the first note is a banknote or a check; and verify in a third step presence of at least one predetermined characteristic feature of preset accepted checks present in the first note if the control unit previously determined that the first note is not a banknote.

16. The device of claim 15, wherein the control unit is configured to control the at least one processing unit to separate other sheet-shaped media from banknotes and checks, and to return the other sheet-shaped media to a user of the device.

17. The device of claim 15, wherein the control unit is configured to determine whether each one of the notes of value is a banknote, a check, or other sheet-shaped media based on at least one of a gray scale gradient, a light-dark distribution, a color gradient, reflection property of infrared light, or absorption property of infrared light in the image of the note of value.

18. The device of claim 15, wherein the at least one processing unit includes a sorting gate, an intermediate storage, and an aligning unit configured to direct the notes of value through the device.

19. The device of claim 18, wherein the at least one processing unit is configured to direct checks and banknotes to separate cassettes of the device.

20. The device of claim 19, wherein the input device is configured to receive banknotes, checks, and other sheet-shaped media in a single stack.

* * * * *